Aug. 21, 1956  M. C. McFARLAND  2,759,740
FRAME BRACE AND ALIGNER
Filed Jan. 10, 1955  2 Sheets-Sheet 1
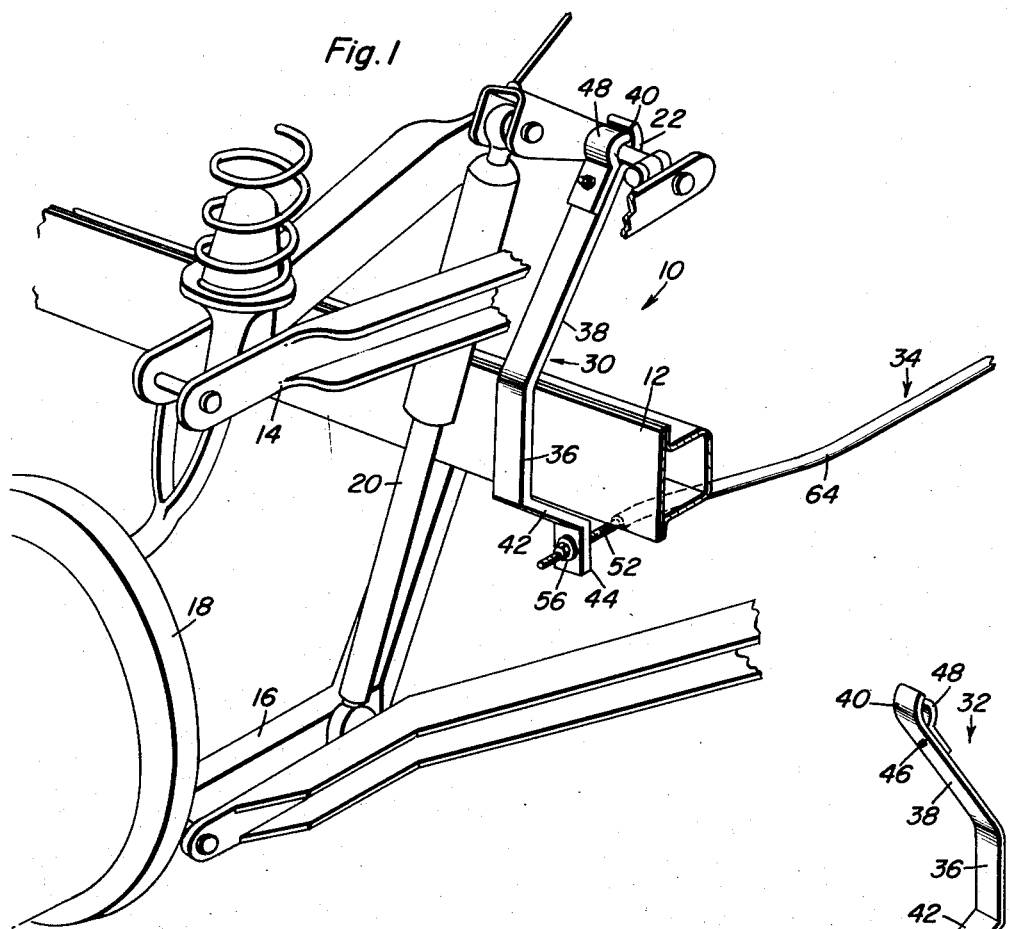
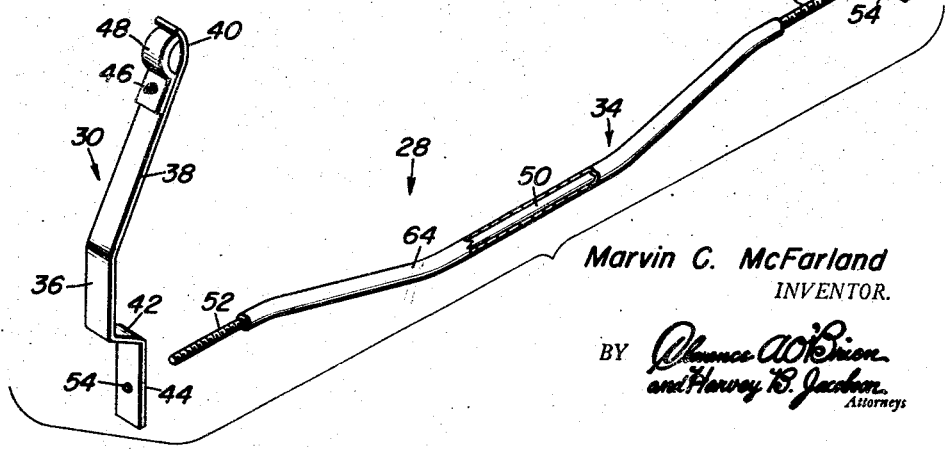
Marvin C. McFarland
INVENTOR.

Aug. 21, 1956

M. C. McFARLAND 2,759,740

FRAME BRACE AND ALIGNER

Filed Jan. 10, 1955

Marvin C. McFarland
INVENTOR.

United States Patent Office 2,759,740
Patented Aug. 21, 1956

2,759,740

FRAME BRACE AND ALIGNER

Marvin C. McFarland, Aberdeen, N. C.

Application January 10, 1955, Serial No. 480,817

5 Claims. (Cl. 280—106.5)

This invention relates in general to new and useful improvements in automotive equipment, and more specifically to an improved frame brace and aligner.

In vehicles which have independently sprung front ends, the entire shock of the wheel assemblies is transmitted directly to the front portion of the frame so that there is a tendency for the front portion of the frame to twist and spread. Such twisting or spreading action will result in the changing of the camber of the front wheels and in some instances, in the case of box frames, will result in opening of the welded seams.

It is therefore the primary object of this invention to provide an improved frame brace and aligner which may be attached to vehicles so as to reinforce the frame at the front portion thereof in the vicinity of the front wheels and to hold the frame in alignment.

Another object of this invention is to provide an improved frame brace and aligner which is so constructed whereby it may be placed upon existing vehicles for reinforcing the frame thereof to prevent the spreading and twisting of the frame due to the shocks and loads imposed thereupon by the individually sprung front wheels.

Another object of this invention is to provide an improved frame brace and aligner for independently sprung front end type vehicles, the frame brace and aligner being so constructed whereby it may be attached to the vehicle without any changes in the vehicle construction whatsoever.

A further object of this invention is to provide an improved frame brace and aligner for vehicles which include individually sprung front ends, the frame brace and aligner being so constructed whereby it firmly engages the frame to prevent both spreading and twisting of the frame rails thereof and utilizes as an anchoring structure the shafts for the upper control arms, the frame brace and aligner being adjustable so as to properly align and brace the frame.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary perspective view of a front end system of a vehicle including a part of the frame thereof and shows attached thereto a portion of the frame brace and aligner which is the subject of this invention, the relationship between a brace arm and the frame and an upper control arm shaft being clearly illustrated;

Figure 2 is an exploded perspective view of the frame brace and aligner which is the subject of this invention and shows the general details thereof;

Figure 3:
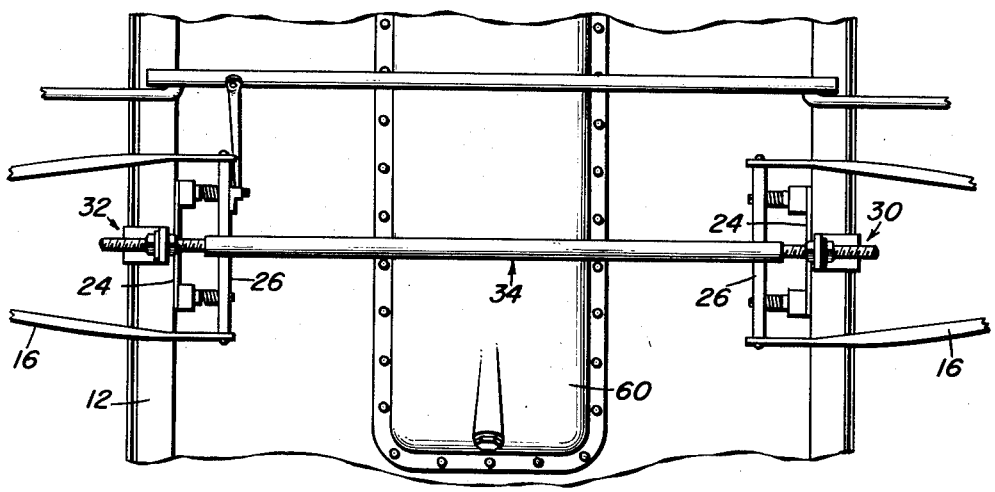
Figure 3 is a bottom plan view of the vehicle of Figure 1 and shows the frame brace and aligner in position.

Referring now to the drawings in detail, it will be seen that there is illustrated in Figures 1 and 3 a conventional type of front end assembly which is referred to in general by the reference numeral 10. The front end assembly 10 is carried by the frame 12 of the vehicle and includes an upper control arm assembly 14 and a lower control arm assembly 16. The control arm assemblies 14 and 16 are suitably connected together at their outer ends to support a wheel drum 18. Inner portions of the control arm assemblies 14 and 16 are connected together by a suitable shock absorber assembly 20.

The upper control arm assembly 14 is pivotally mounted on an upper control arm shaft 22 which is suitably supported relative to the frame 12. As is best illustrated in Figure 3, secured to the frame 12 and depending therefrom is a support plate 24 which has adjustably secured thereto a lower control arm shaft 26 on which the lower control arm assembly 16 is mounted.

In order to prevent twisting of the individual frame rails of the frame 12 with respect to each other due to the forces applied thereto by the front end assembly 10, there is provided the frame brace and aligner which is the subject of this invention, the frame brace and aligner being referred to in general by the reference numeral 28. The frame brace and aligner 28 includes a pair of brace arms 30 and 32 which are adjustably connected together by a rod which is referred to in general by the reference numeral 34.

Inasmuch as the brace arms 30 and 32 are identical with the exception that they are left and right hand arms, only the brace arm 30 will be described in detail. The brace arm 30 is generally C-shaped in outline and includes an intermediate vertical portion 36. Formed integral with the intermediate portion 36 and sloping upwardly and inwardly is an upper portion 38 which terminates in a reversely bent upper end 40. Also formed integral with the intermediate portion 36 is a downwardly and inwardly sloping lower portion 42. The lower portion 42 has formed integral with the inner end thereof a depending vertical attaching flange 44.

Releasably secured to the upper portion 38 adjacent the upper end 40 by means of a fastener 46 is a clamp member 48.

The rod assembly 34 includes a solid rod member 50 which has threaded end portions 52. The end portions 52 are received through bores 54 formed in the attaching flanges 44. Each of the threaded portions 52 is provided with a pair of adjustable nuts 56 which are positioned on opposite sides of their associated attaching flange 44 to assure proper positioning of the associated brace arm 30 or 32, as the case may be.

Figure 4:
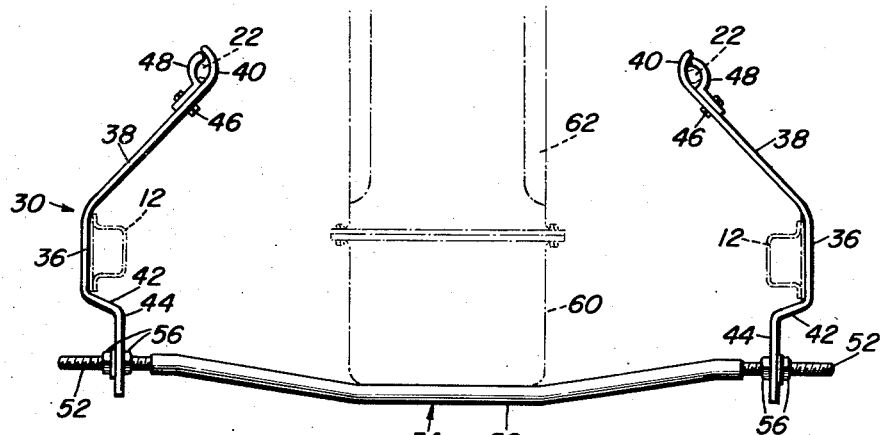
Figure 4 is an elevational view of the frame brace and aligner and shows the relationship thereof with respect to components of the vehicle, the components being illustrated by broken lines.

When the frame brace and aligner 28 is positioned, the intermediate portion 36 engages the outermost part of the frame 12, as is best illustrated in Figures 1 and 4. The upper end 40 of each brace arm is disposed behind the upper control arm shaft 22 and is retained in position by the clamp member 48 which engages the outer part of the upper control arm shaft 22 and clamps it against the upper end 40.

Due to the fact that the upper portion 38 and the lower portion 32 of each of the brace arms converge outwardly, it will be seen that the frame 12 will be wedgedly seated in the recessed portion of the brace arm. This is assured by the pivoting action of each brace arm 30 about its associated upper control arm shaft 22, due to the inward pull of the rod assembly 34.

As is best illustrated in Figure 2, the rod assembly 34 is downwardly bowed in the central part thereof, as at 58. This is to permit the clearance of the crankcase 60 of the engine 62 of the vehicle on which the frame brace and aligner 28 is positioned. In order that the rod 50 may be braced or reinforced to overcome the offsetting of the central portion thereof, there is carried by a major portion of the rod 50 between the threaded end portions 52 a sleeve 64 which is telescoped thereover and which tightly fits the same. The sleeve 64 is applied before the rod 50 is bent to shape.

From the foregoing, it will be readily apparent that the construction of the frame brace and aligner 28 is such that it may be easily attached to an existing vehicle without any special fittings whatsoever being permanently secured to the vehicle. Also, it will be readily apparent that proper adjustment may be easily obtained through the use of the nuts 56. Further, from the foregoing description of the invention, it is readily apparent that it will perform the desired operation of both aligning and bracing the frame 12.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. For use in combination with a frame of a vehicle of the independent front suspension type including an upper control arm shaft at each side, a frame brace and aligner comprising a pair of brace arms engageable with opposite sides of the frame, means carried by upper ends of said brace arms for anchoring said brace arms to the upper control arm shafts, and an elongated rod extending between lower portions of said brace arms and adjustably secured thereto.

2. For use in combination with a frame of a vehicle of the independent front suspension type including an upper control arm shaft at each side, a frame brace and aligner comprising a pair of brace arms engageable with opposite sides of the frame, means carried by upper ends of said brace arms for anchoring said brace arms to the upper control arm shafts, and an elongated rod extending between lower portions of said brace arms and adjustably secured thereto, said rod being provided with an offset central portion for clearing an engine of the vehicle.

3. For use in combination with a frame of a vehicle of the independent front suspension type including an upper control arm shaft at each side, a frame brace and aligner comprising a pair of brace arms engageable with opposite sides of the frame, means carried by upper ends of said brace arms for anchoring said brace arms to the upper control arm shafts, and an elongated rod extending between lower portions of said brace arms and adjustably secured thereto, said rod being provided with an offset central portion for clearing an engine of the vehicle, a sleeve telescoped over and reinforcing said central portion.

4. For use in combination with a frame of a vehicle of the independent front suspension type including an upper control arm shaft at each side, a frame brace and aligner comprising a pair of brace arms engageable with opposite sides of the frame, means carried by upper ends of said brace arms for anchoring said brace arms to the upper control arm shafts, and an elongated rod extending between lower portions of said brace arms and adjustably secured thereto, said brace arms being generally C-shaped for receiving frame rails of the frame therein.

5. For use in combination with a frame of a vehicle of the independent front suspension type including an upper control arm shaft at each side, a frame brace and aligner comprising a pair of brace arms engageable with opposite sides of the frame, means carried by upper ends of said brace arms for anchoring said brace arms to the upper control arm shafts, and an elongated rod extending between lower portions of said brace arms and adjustably secured thereto, said brace arms being generally C-shaped for receiving frame rails of the frame therein, upper and lower parts of each brace arm being in divergent relation whereby the frame is wedgedly received therebetween.

References Cited in the file of this patent

UNITED STATES PATENTS

| | | |
|---|---|---|
| 1,650,001 | Ahlm | Nov. 22, 1927 |
| 2,499,654 | Kuhlman | Mar. 7, 1950 |